May 17, 1927.
F. A. BENFORD
LIGHT PROJECTOR
Filed Dec. 28, 1922
1,629,333
3 Sheets-Sheet 1
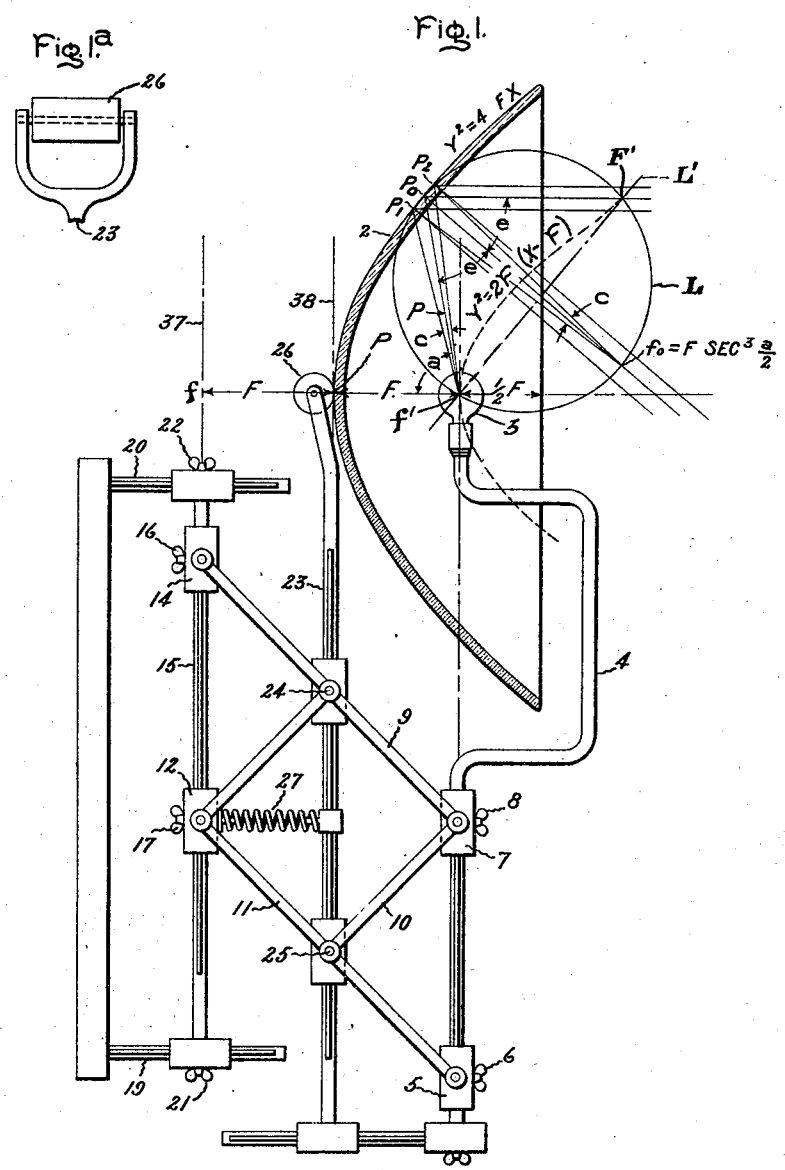
Inventor:
Frank A. Benford,
by His Attorney.

May 17, 1927.

F. A. BENFORD 1,629,333

LIGHT PROJECTOR

Filed Dec. 28, 1922

3 Sheets-Sheet 2

Inventor:
Frank A. Benford,
by
His Attorney.

May 17, 1927.
F. A. BENFORD
1,629,333
LIGHT PROJECTOR
Filed Dec. 28, 1922
3 Sheets-Sheet 3
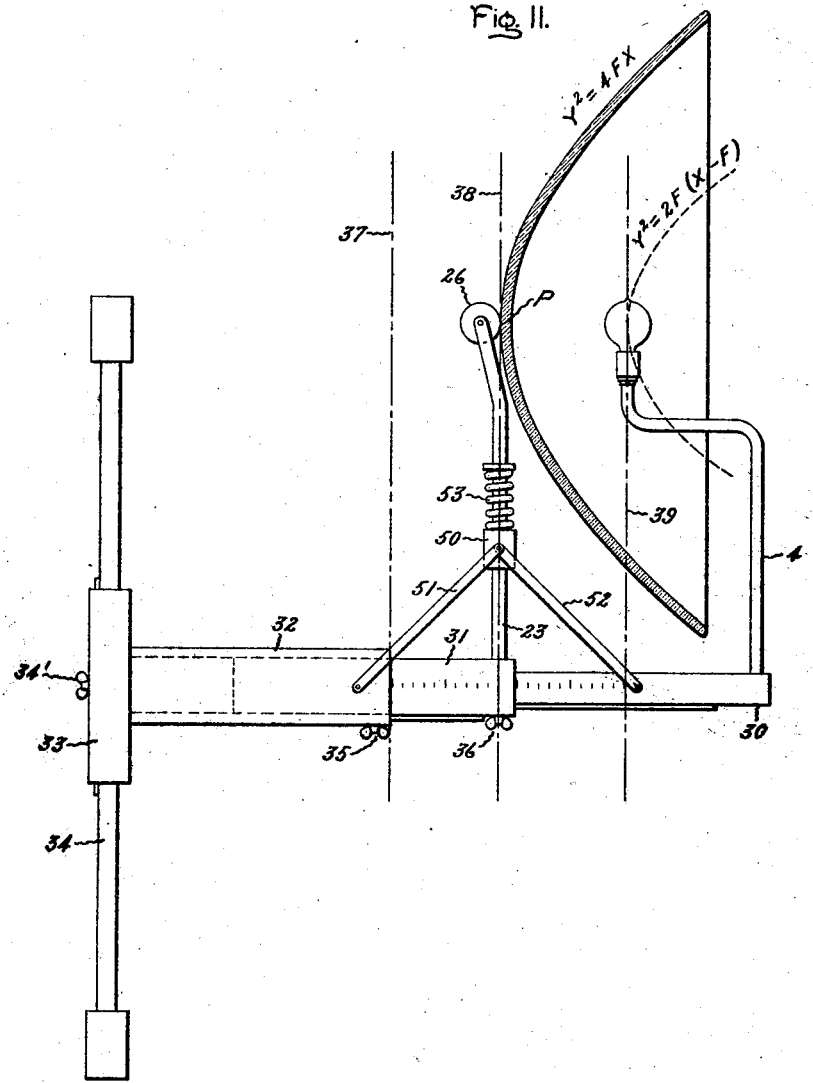
Inventor:
Frank A. Benford,
by
His Attorney.

Patented May 17, 1927.

1,629,333

UNITED STATES PATENT OFFICE.

FRANK A. BENFORD, OF SCHENECTADY, NEW YORK, ASSIGNOR TO GENERAL ELECTRIC COMPANY, A CORPORATION OF NEW YORK.

LIGHT PROJECTOR.

Application filed December 28, 1922. Serial No. 609,469.

My invention relates to light projectors that may be used for spot lighting, head lighting, flood lighting and the like.

Among the objects of my invention are the following: to provide a projector which will project a light beam with an oval cross section; to provide such a device which can produce an oval beam with a single, or bright spot of maximum illumination; to provide a device of the above character, the beam of which can be varied from a circle to an oval and in which the length of the major axis of the oval may be varied at will and in which the bright spot may be caused to approach the small end of the oval; to provide a cam for directing the path of movement of the source of light in order to vary the character of the beam; and to provide other details of improvement tending to increase the efficiency and serviceability of a device of the above character.

Figure 8:
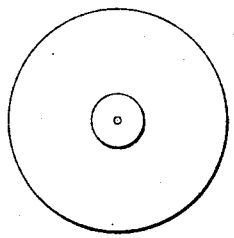
Figure 9:
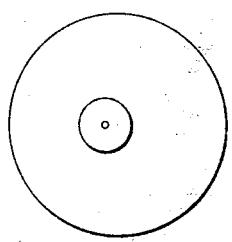
Figure 10:
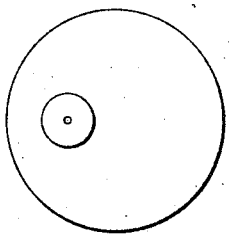
Figure 2:
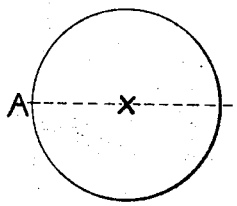
Figure 3:
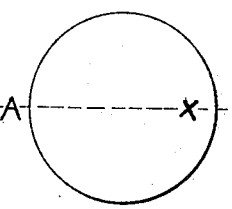
Figure 4:
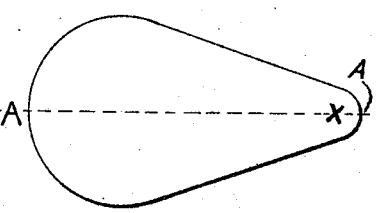
Figure 5:
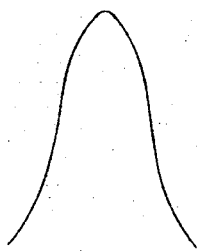
Figure 6:
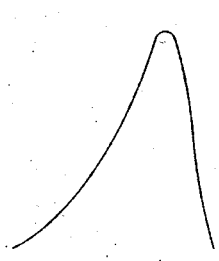
Figure 7:

The means for accomplishing the foregoing and other useful ends are hereinafter more fully set forth and claimed. Referring to the accompanying drawings, Fig. 1 is a side view in elevation, partly in section, of the device; Fig. 1ª is a detail thereof; Fig. 2 shows a right section of the beam on a screen at right angles to the beam when the source of light is at the main focal point F of the reflector, Fig. 1; Fig. 3 shows a right section of the beam on the same screen with the light moved along the curve $Y^2=2F(X-F)$ a short distance from the focal point F; Fig. 4 shows a right section of the beam on the same screen when the light source is further moved away from the focal point F along the same curve; Figs. 5, 6 and 7 are curves showing the distribution of light in the beams represented in Figs. 2, 3 and 4 respectively along the arcs A—A; Figs. 8, 9 and 10 show the location of the light source with respect to the reflector; Fig. 11 is another form of the projector. It will be seen that Figs. 2, 8 and 5 are particularly related; likewise, Figs. 3, 9 and 6 and likewise Figs. 4, 10 and 7. This relation indicates the fact that when the source of light in the positions indicated in Figs. 8, 9 and 10, the distribution of the light in the beam is as represented respectively by Figs. 5, 6 and 7 and the location of the bright spot in the beam is as represented respectively by Figs. 2, 3 and 4.

I have found, if I take a parabolic reflector, the surface of which is generated by rotating the curve $Y^2=4FX$ about the major axis, that I can produce a beam of light which varies from a circle to an oval, and I can vary the length of the oval, preserving all the while a spot of high or maximum illumination in the neighborhood of the small end of the oval, provided I move the source of light along a second surface related to the reflector surface, which second surface is generated by rotating the curve $Y^2=2F(X-F)$ about the same major axis.

A device of the above character may be used to great advantage in flood lighting a road. As is well known, due to perspective, the road appears to get narrower and narrower the farther away it extends. By producing an oval beam with the bright spot in the lead and throwing it on the road so that the small part of the oval is in the lead and the large part of the oval follows, very efficient and satisfactory illumination results inasmuch as the intense spot illuminates the farthest point along the road, whereas the nearest part of the road to the light source is sufficiently illuminated by the large part of the oval which falls across the entire or approximately the entire road at the point nearest the source of light as indicated in Fig. 4, where the roadway is represented by the diverging dotted lines.

Referring more in detail to the drawings, the parabolic mirror or reflector 2, Fig. 1, is permanently mounted on any suitable structure or frame as is usually the case in a projector headlight, searchlight or other similar device. The source of light 3 may be of any suitable character, such as an arc, an incandescent lamp or light. In the drawing, Fig. 1, the light is shown at the main focal point F of the reflector 2. This lamp is mounted on an adjustable mechanism which has an arm 4 which serves as a supporting standard. The arm may be secured to the collars 5 and 7 by the set screws 6 and 8. These collars are adjustable along the standard. After the proper adjustment, hereinafter more fully explained, is secured, the set screws 6 and 8 are tightened to clamp the collars 5 and 7. These collars, 5 and 7, are pivotally secured to arms 9, 10 and 11 which are in turn pivoted to similar collars 12 and 14. The collars of this last set are adjustably mounted on a rod 15 and are provided with suitable set screws 16 and 17. The rod 15 is as shown adjustably secured to the supports 19 and 20 by the thumb bolts 21 and 22. I also provide a guide rod 23 which is pivotally mounted to the arms 9, 10 and 11 at the pivot points 24 and 25. The upper end of this rod is forked and bent away from the reflector 2 and carries on the end thereof a small roller 26 which is adapted to roll on the back or reflecting surface of the reflector 2. The arrangement is such that the point of contact between the roller and the reflector 2 falls in the line connecting the pivots 24 and 25. Between the rods 15 and 23 I provide compression springs 27 which serve to press the arm 23 away from the arm 15 and to maintain the roller 26 always in contact with the rear surface of the reflector 2 during the adjustment of the mechanism, that is, while the collars are unlocked. In order to obtain the best results, roller 26 is made as small as possible in order to maintain the point of contact between the roller and the mirror on the line extending through the points 24 and 25, or as near thereto as possible, no matter what the position of the roller 26 may be. In order to set the lamp guiding mechanism with respect to the reflector 2, the bolts 22 and 21 and the screws 6, 8, 16, 17, are loosened and the lamp 3 moved to the focal point F while the roller 26 is held in contact at the point shown in Fig. 1 where the major axis intersects the back surface of the mirror. With the lamp in this position set screws 21 and 22 are then tightened. If, with the lamp in the focal point F, the remaining screws are also tightened, the apparatus will produce a beam similar to that shown in Fig. 2. If it is desired to produce a beam similar to that shown in Fig. 3, the lamp 3 is moved along the curve $$Y^2 = 2F(X-F)$$

until the beam of desired shape is obtained and then the set screws 6, 7, 16 and 17 are clamped to hold the lamp in position. At any time thereafter the beam may be changed; if, for example, it is desired to change the beam to that shown in Fig. 4, the set screws 6, 7, 16 and 17 are loosened and the lamp 3 is moved along the curve until a beam with the desired oval formation is obtained at which point the lamp 3 is fixed by tightening the screws so as to hold the lamp at such a point. The × marks in Figs. 2, 3 and 4 indicate the position of the bright spot in the beam in each instance. It will be understood of course that the roller 26 uses the back surface of the reflector 2 as a directrix to hold the lamp 3 in its movement along the curve $$Y^2 = F(X-F).$$

As indicated in the drawings the distance between the parallel lines 37 to 38 passing respectively through the bolts 21 and 22, and 24 and 25 is F (the F of the equations heretofore mentioned). Furthermore, the distance between the lines 38 and 39 passing respectively through the points 24 and 25 and through the focal point F is also the F of the equations.

It will thus be seen that I have provided an adjusting mechanism for varying the character of a beam reflected by a mirror which mechanism uses a surface of predetermined character for determining the character of the beam and for predetermining the character of beam to be produced.

It is well known that if a point source of light is placed at the focus of a parabolic reflector such as reflector 2, Fig. 1, the reflected rays will be parallel to the axis. Thus the surface at $P_0$, Fig. 1, will reflect a parallel beam through $F'$, and if we made the distance $F'P_0$ equal to $P_0 f'$, then with a light source at $F'$ the light reflected from $P_0$ will be a beam of parallel rays passing through the principal focus $f'$. This is equivalent to saying that $F'$ and $f'$ are conjugate foci to the element of surface $P_0$.

The rectangular form of equation for the parabola is $y^2 = 4FX$ and the length of a radius vector is $P = F + x$.

If the coordinates of the point P are $x$ and $y$, then the coordinates of $F'$ are $$x + (F+x)$$

and $y$, or $2x + F$ and $y$ we then have $$y^2 = 2F(x-F)$$

for the locus of $F'$, that is, $F'$ moves along a parabola having a focal length of $\frac{1}{2}F$ and having its vertex at the focal point of the reflector. The foregoing follows from well known optical principles that if the light source is moved in a circle, such as circle L, tangent to the reflector, as for example at the point $P_0$, the diameter of which is $F\sec^3\frac{a}{2}$ and lying in the meridian plane of the paraboloid 2 the light reflected from an element at the point of tangency $P_0$ will have components parallel to each other in the meridian plane. Also if the light source is moved along a straight line $L'$ parallel to the tangent at the point $P_0$ at a distance $F\sec\frac{a}{2}$ the components of light at right angles to the above components in the sagittal plane will be parallel. Therefore, at the point where the circle and a straight line L′ cross, the reflector surface has two principal foci, one of which is the principal focus of the entire reflector and the other of which is the principal focus for the particular point $P_0$ only. The locus of all such special foci is a parabola whose equation is $y^2 = 2F(x-F)$.

It will be understood that the roller may be used either with the reflecting surface or a guide, or with a guiding surface identical with the parabolic surface and set back of it any distance as the guiding element.

It will also be understood that the track surface need not necessarily be back of the reflector itself. A separate surface or a separate track having the same curvature as the reflector will do. For example, if the mirror is a parabola with a given curvature, a separate surface may be provided as a track having a curvature identical in form with that of the reflector surface. Also, it will be understood that it is not necessary that the track should cover the same extent of area covered by the reflector.

With respect to the form of construction of apparatus shown in Fig. 11, it will be seen that the arm 4, corresponding to the arm 4 in Fig. 1, is mounted on a rod 30 which is provided with a suitable scale. This rod 30 is slidably mounted within a second rod 31, likewise provided with a suitable scale. The rod 31 is in turn slidably mounted in the hollow rod 32 which latter is secured to the collar 33, slidably mounted on the upright 34. The upright 34 may be permanently secured in any suitable manner. The collar 33 is provided with a thumb screw 34′ in order that the rod 32 may be adjusted up and down to any level desired. Upon this rod 31 is mounted the arm 23 corresponding to the arm 23 in Fig. 1 on the upper extremity of which is mounted the small roller 26. To set the device shown in this Fig. 11 the source of light is placed in the focal point of the reflector and with the light held in this position, the collar 33 is moved along the upright 34 until the center of the roller 26 arrives at the point P on the major axis of the reflector. When the apparatus is thus adjusted, the thumb screws 34′, 35 and 36 are tightened. This will give a round beam similar to that shown in Fig. 2. In order to change the beam the thumb screws 34′ and 35 and 36 are loosened and the collar 33 lowered until the source of light reaches the position on the curve $Y^2 = 2F(X-F)$ corresponding to the beam desired. It will be understood that as the collar 33 is lowered the spring 53 continues to press the collar 50 to the right, thereby maintaining the roller 26 against the rear surface of the reflector. When the desired beam is obtained, the thumb screws 34′ and 35 and 36 are set so as to hold the beam. As I have indicated in Fig. 11, the line 37 which is at right angles to the major axis of the reflector, extends downward through the face forming the right-hand terminal of the rod 32. The scale on the rod 31 extends toward the right only as far as the line 38 which passes through the point of intersection P between the major axis of the reflector. The scale on the rod 30 extends to the right only as far as line 39 which extends through the focal point of the reflector. All of these lines 37, 38 and 39 are parallel. With this arrangement, when the roller 26 is raised to the point P, the scale on the rod 31 will indicate a certain dimension. The distance between the lines 37 and 38 will be F, and the distance between the lines 38 and 39 will likewise be F (the F of the equations). The focal point of the parabola $Y^2 = 2F(X-F)$ is of course $\tfrac{1}{2}F$. It should be explained that the upright 34 is provided with a suitable key so that the collar 33 may slide up and down, but may not rotate. Furthermore, I provide on the arm 23 a sliding collar 50 which is connected by means of the arms 51 and 52 with the rods 32 and 30. These arms are pivoted at all points of support. On the upper side of the collar 50 I provide a compression spring 53 which always tends to force the collar 50 toward the lower part of the rod 23, that is toward the tube 31. With this construction, it will be seen that by moving the collar 50 up and down, the rods 30 and 31 are moved back and forth with respect to the tube 32, the ratio of movement of the tube 30 being twice the ratio of movement of the tube 31 inasmuch as the point of support of these arms on the collar 50 lies in a line which is equi-distant from lines parallel thereto passing through the points of support on the arms 51 and 52 on the tubes 32 and 30. By moving the collar 33 down from the position shown in Fig. 11, the spring 53 forces the arm 31 toward the right, maintaining the roller 26 against the rear surface of the reflector. At the same time, the arm 30 is moved toward the right carrying the source of light along the parabolic curve $Y^2 = 2F(X-F)$. In other words, I have provided a device which automatically causes the source of light to move along the parabola last mentioned by moving the collar 33 down along the rod 34. Reversing the direction of motion of the collar 33 will reverse the direction of travel of the light source. If necessary, this motion may be assisted by applying a pressure to the rod 30 in a direction at right angles to the line 39. It will be understood that the light supporting means which includes the supports 4, 15, 19 and 20 may be rotated as a whole about the axis of the reflector.

The apparatus which I have shown and described therefore embodies in concrete form my invention as is required, but I do not limit myself to such specific form since various modifications will suggest themselves to those skilled in the art without departing from the spirit of my invention, the scope of which is measured by the claims herein contained.

What I claim as new and desire to secure by Letters Patent of the United States, is,—

1. In combination a paraboloidal reflector, a source of light, and mechanical means for moving said source along a parabolic path in front of the reflector, the reflector and the path having a common axis.

2. In combination, a paraboloidal reflector, a source of light, and mechanical means for moving said source along a parabolic path in front of the reflector, the rear surface only of said reflector serving as a directrix for said means.

3. In combination, a paraboloidal reflector, a source of light, and mechanical means for moving said source along a parabolic path, said means comprising a movable point, said reflector serving as a track for said point.

4. In combination, a light fixture for supporting a light source, a paraboloidal cam serving as a track for the fixture and a paraboloidal reflector whereby the light source may be moved in front of the reflector in a parabolic path.

5. In combination, a paraboloidal reflector, a light source, a movable fixture for supporting said source in front of the reflector and a paraboloidal cam for determining the movement of the fixture and of the light source along a parabolic curve through the focal point of the reflector whereby the shape of the beam may be varied from round to oval.

6. In combination, a paraboloidal reflector, a source of light, and mechanical means for moving said source along a parabolic path, said means comprising an arm suitably pivoted, said source secured to said arm and said reflector serving as a directrix for the movement of said arm and of said source.

7. In combination with a paraboloidal reflector, a source of light and an adjustable support for said source whereby the light source may be moved along a paraboloidal area in front of said reflector, said area having an axis common with the axis of the reflector, the focal point of the reflector and the point of origin of the said area coinciding, and a guiding cam for the support for determining the path of said source when the source is moved.

8. In combination, a parabolic reflector, a source of light, and mechanical means for moving said source along a path in front of the reflector, the rear surface only of said reflector serving as a directrix for said means, the path of said source being along an area similar to the surface of the reflector.

9. In combination with a paraboloidal reflector, a plane through the axis of which intercepts a parabola $Y^2=4FX$, a light source located at a point in a second parabola $Y^2=2F(X-F)$, both of the parabolas being referred to the same axis of coordinates and having a common axis, and a mechanical device for moving said light along the second parabolic path.

In witness whereof, I have hereunto set my hand this 27th day of December, 1922.

FRANK A. BENFORD.